United States Patent
Black et al.

[11] Patent Number: 5,494,018
[45] Date of Patent: Feb. 27, 1996

[54] ALTITUDE DEPENDENT FUEL INJECTION TIMING

[75] Inventors: Robert P. Black, Milford; Stephen W. Smerika, Fenton, both of Mich.

[73] Assignee: General Motors Corporation, Detroit, Mich.

[21] Appl. No.: 328,787

[22] Filed: Oct. 28, 1994

[51] Int. Cl.$^6$ ................................................. F02D 41/04
[52] U.S. Cl. ............................................................ 123/478
[58] Field of Search ................................... 123/357, 380, 123/478, 480, 494, 501, 502

[56] References Cited

U.S. PATENT DOCUMENTS

| | | | |
|---|---|---|---|
| 3,785,353 | 1/1974 | Borisov et al. | 123/483 |
| 4,367,716 | 1/1983 | Yasuhara | 123/478 |
| 4,368,705 | 1/1983 | Stevenson et al. | 123/486 X |
| 4,492,202 | 1/1985 | Muramatsu et al. | 123/478 |
| 4,803,966 | 2/1989 | Denz | 123/478 |
| 4,817,574 | 4/1989 | Engel et al. | 123/494 |
| 4,819,606 | 4/1989 | Kawano | 123/380 X |
| 4,821,698 | 4/1989 | Atago et al. | 123/478 |
| 4,825,369 | 4/1989 | Oshizawa | 364/431.05 |
| 4,831,537 | 5/1989 | Scarnera et al. | 364/431.05 |
| 4,884,546 | 12/1989 | Sogawa | 123/486 |
| 4,957,086 | 9/1990 | Sasaki et al. | 123/478 |
| 5,003,952 | 4/1991 | Weglarz et al. | 123/478 |

*Primary Examiner*—Tony M. Argenbright
*Attorney, Agent, or Firm*—Michael J. Bridges

[57] ABSTRACT

The engine operating angle at which a determined fuel injection quantity is delivered to the engine is varied in accord with barometric pressure variations to compensate an engine air-fuel mixing time to offset variations in air-fuel mixture homogeneity prior to combustion, promoting complete combustion, increased engine performance, increased catalytic converter efficiency and durability over a wide range of barometric pressure values.

9 Claims, 4 Drawing Sheets

ALTITUDE DEPENDENT FUEL INJECTION TIMING

FIELD OF THE INVENTION

This invention relates to automotive engine controls and, more particularly, to fuel injection timing control for an automotive internal combustion engine.

BACKGROUND OF THE INVENTION

It is generally known to vary fuel injection timing, which is the time a given fuel injection quantity is delivered to an engine, as a function of engine temperature, such as may be indicated by engine coolant temperature. Furthermore, it is generally known to vary the fuel injection quantity itself as a function of variations in atmospheric pressure, generally to compensate for variations in air density that may lead to variations in engine air/fuel ratio. Such conventional engine control fails to compensate for changes in homogeneity of the air/fuel mixture caused by varying barometric pressure. For example, engine air intake manifold absolute pressure decreases with decreasing barometric pressure, leading to a reduction in air/fuel mixing before combustion. The reduction in air/fuel mixing leads to a less uniform air/fuel mixture available for combustion which can lead to incomplete combustion. Incomplete combustion leads to decreased engine performance and increased hydrocarbon HC levels in engine exhaust. Increased HC levels can lead to decreased catalytic converter efficiency and increased converter temperatures which can reduce converter durability. Such difficulties are not resolved through conventional approaches to fuel injection control.

It would therefore be desirable to compensate for changes in barometric pressure, such as caused by changes in the altitude at which a vehicle including a catalytic treatment device is operated, so as to provide for more uniform air-fuel mixing prior to combustion leading to more complete combustion and increased engine performance, converter efficiency and converter durability.

SUMMARY OF THE INVENTION

The present invention addresses the shortcomings of conventional fuel injection control systems by providing direct compensation for change in barometric pressure by varying the time a given fuel injection quantity is delivered to the engine as a predetermined function of sensed or estimated barometric pressure. In a further aspect of this invention, the change in barometric pressure may be measured directly through a pressure sensing device, or in a low cost alternative, may be estimated using information from conventional engine sensors without requiring additional sensors. In yet a further aspect of this invention, a discrete number of fuel injection timing offset values may be determined each as a function of a corresponding barometric pressure value over a range of expected barometric pressure values. During engine operation, barometric pressure may periodically be sensed or estimated and a corresponding timing offset value referenced for injection timing variation to maintain engine performance and converter efficiency and durability despite even significant changes in barometric pressure.

Through such compensation, improvements in catalytic treatment device construction may be provided, reducing the cost of such treatment devices. For example, it is generally known that catalytic converter efficiency may be increased for certain engine operating conditions by adding certain costly noble metals to the catalytic treatment device. Through the compensation provided in accord with the present invention, such costly addition of noble metals may be reduced or eliminated entirely without reduction in catalytic convertor efficiency to provide for acceptable catalytic treatment of engine exhaust gas at lower cost.

BRIEF DESCRIPTION OF THE DRAWINGS

The invention may be best understood by reference to the preferred embodiment and to the drawings in which.

DESCRIPTION OF THE PREFERRED EMBODIMENT

Figure 1:
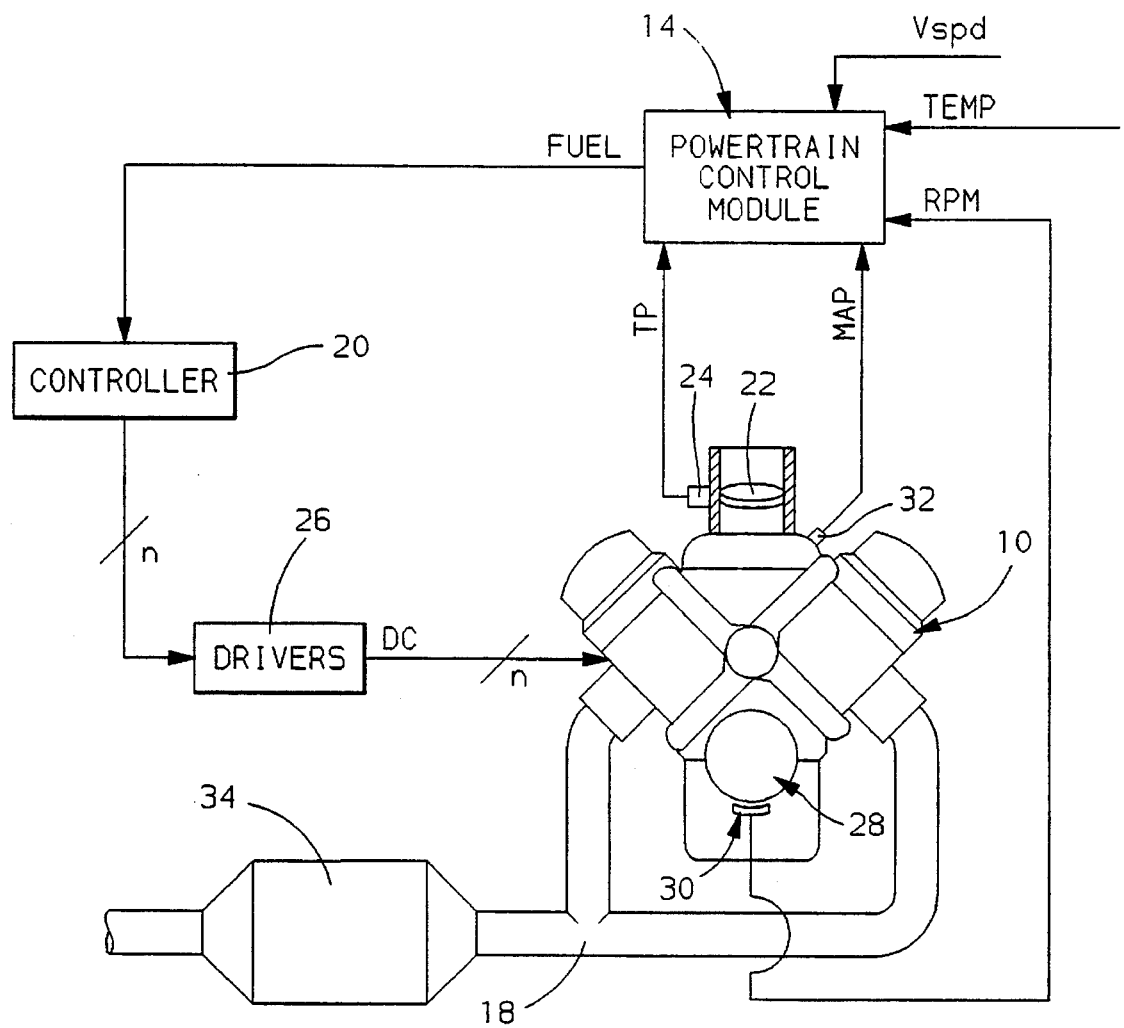
FIG. 1 is a general diagram illustrating hardware used for fuel injection timing control in accord with the preferred embodiment.

Referring to FIG. 1, intake air is metered to internal combustion engine 10 by intake air valve 22, which may be a conventional butterfly throttle valve the rotational position of which is sensed by conventional rotational potentiometric position sensor 24 which transduces the rotational valve position and outputs signal TP indicating such transduced position. Intake air passes valve 22 and is received within an intake manifold of the engine 10 for distribution to engine cylinders. The absolute air pressure within the intake manifold is sensed by conventional pressure sensor 32 which outputs signal MAP indicating such pressure.

The intake air is combined with a fuel charge and admitted for combustion to engine cylinders. Combustion gasses are exhausted out of the cylinders through engine exhaust gas conduit 18 and are guided through conventional three-way catalytic converter 34 for catalytic treatment therein. The engine operates to rotate engine output shaft 28, such as an engine crankshaft, wherein the rate of rotation is sensed by conventional sensor 30, such as a variable reluctance or hall effect sensor, which produces periodic output signal RPM having a frequency proportional to the rate of rotation of shaft 28. The engine angular position within an engine cycle may be determined using the signal RPM, wherein an engine cylinder event within a cylinder cycle is assumed to occur for each cycle Of the periodic signal. Engine temperature may be estimated by sensing engine coolant temperature through positioning of a conventional temperature probe having output signal TEMP in an engine coolant circulation path. Vehicle speed may be determined by monitoring the rate of rotation of a transmission (not shown) output shaft or by monitoring the output of at least one conventional wheel speed sensor placed at least a corresponding one vehicle wheel. The vehicle speed value is provided as signal Vspd. A powertrain control module PCM 14 such as a conventional single chip microcontroller having such conventional elements as a central processing unit, volatile and non-volatile memory units, and an input/output control unit, is provided for receiving sensor output signals, such as the described signals TP, MAP, RPM, TEMP and VSPD, and, through execution of powertrain control operations, for generating actuator commands for issuance to various powertrain control. actuators, including fuel injector actuators. The powertrain control module 14 issues a fuel command FUEL which may include fuel injection timing and fuel injector pulse width information to a controller 20 which may be a simple single chip microcontroller for controlling each of n fuel injectors in an n cylinder engine application. Controller 20, with information from powertrain control module 14 in the form of injection timing and duration, determines the active one of the set of n injectors and issues to a driver from the set of drivers 26 for driving that active injector a timed pulse having a duration corresponding to the duration such injector is to open to admit pressurized fuel provided to the injector to the corresponding engine cylinder or cylinders. The drivers 26 may include a single driver for each of n fuel injectors of the engine in which case n input lines to the drivers 26 are provided and n driver output lines to n injectors are provided for fuel control signal distribution in this embodiment. Other fuel injector control mechanizations may be provided through the exercise of ordinary skill in the art to provide for conventional electronic fuel injection control in accord with this invention.

Figure 2:
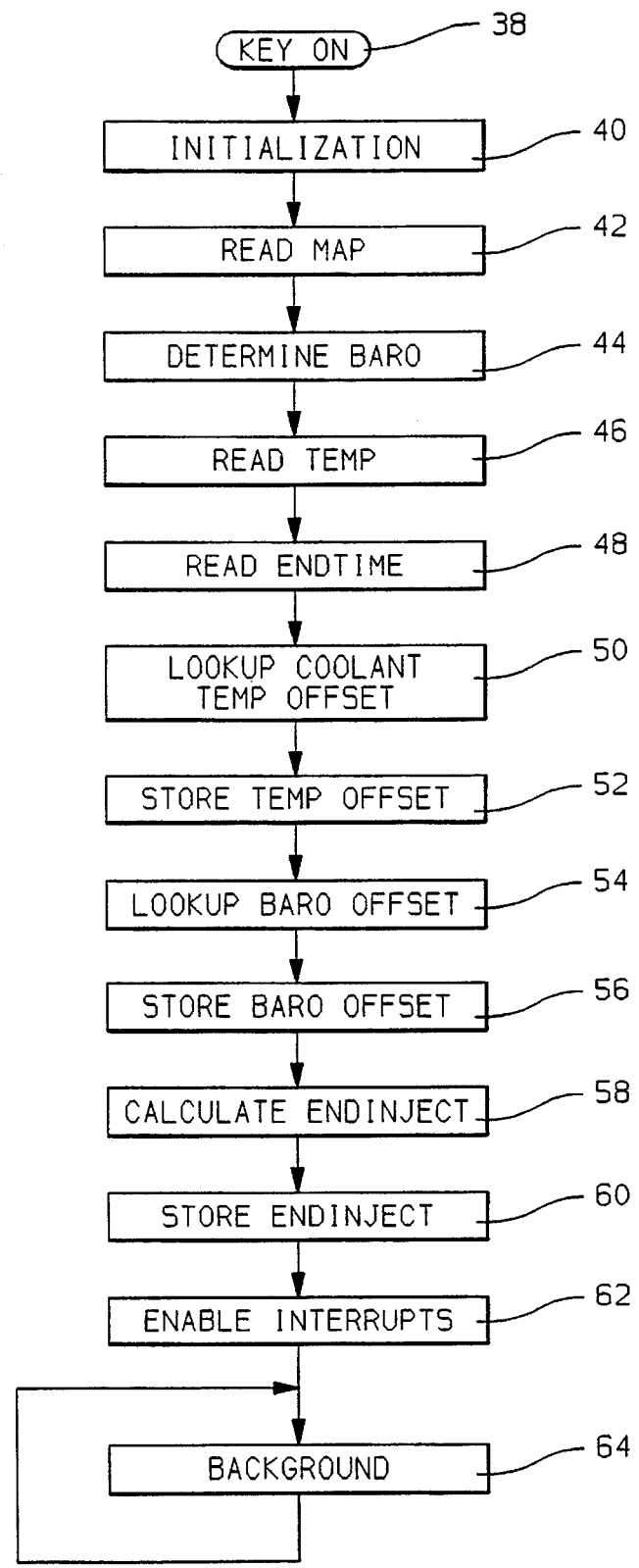
FIGS. 2–4 are computer flow diagrams illustrating steps used to carry out fuel injection timing control in accord with the hardware of FIG. 1.
Figure 3:
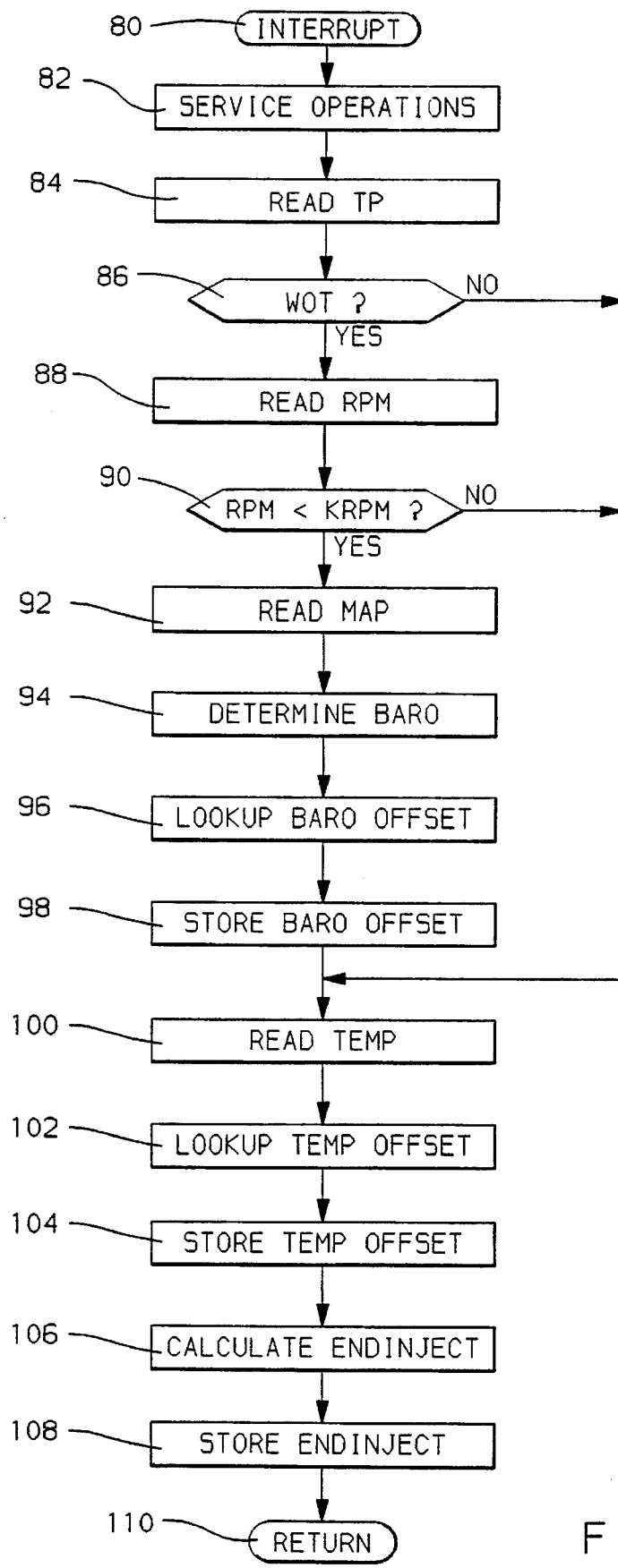
Figure 4:
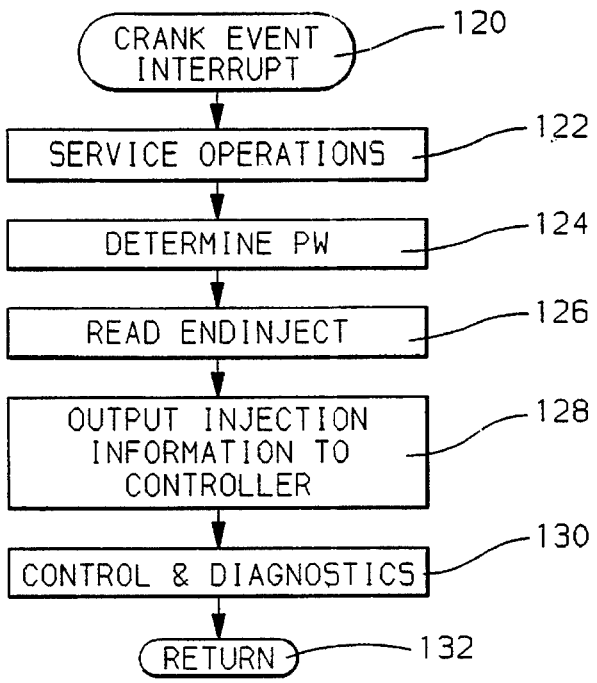

To provide for control of the engine 10, several operations are executed by powertrain control module 14, including the sequence of operations illustrated through the steps of FIGS. 2–4. These routines include fuel injection timing control operations in accord with this embodiment. For example, the routine of FIG. 2 is executed starting at a step 38 when the powertrain control module 14 is turned on, such as when a vehicle operator rotates an ignition key in its "on" position. The routine of FIG. 2 generally includes initialization and start-up functions for powertrain control module 14 start-up. After entering the routine of FIG. 2 at the step 38, general initialization operations are provided for at the step 40. Such operations may include initializing pointers and counters for use by powertrain control module 14, transferring data constants from non-volatile memory to volatile memory, and resetting flags used for powertrain control module operations. The absolute air pressure MAP in intake manifold of engine 10 is next read at a step 42 by examining the output signal MAP of sensor 32 of FIG. 1. The read MAP value closely corresponds to barometric pressure at engine start-up due to the lack of engine suction and the corresponding negligible pressure drop across the intake air valve 22 (FIG. 1). The routine next determines barometric pressure at a step 44. This determination may rely on the reading of MAP at the step 42 which closely corresponds to barometric pressure at engine start up, as described, and further may include information on engine speed RPM and throttle position TP. For example, if engine speed RPM indicates that the engine is running and thus is creating suction in the intake manifold, the throttle position and engine speed may indicate the degree of pressure drop across the intake air valve 22 (FIG. 1) and thus the pressure difference between MAP and BARO. The relationship between RPM, TP and the pressure drop across intake air valve 22 may be determined through a conventional calibration process and stored in non-volatile memory of powertrain control module 14 (FIG. 1) in the form of a lookup table, so that a pressure offset value may be referenced from the table using current RPM and TP information. The offset may be combined with the MAP value read at the step 42 to form a BARO estimate without adding the expense of a specific barometric pressure sensor.

Figure 5:
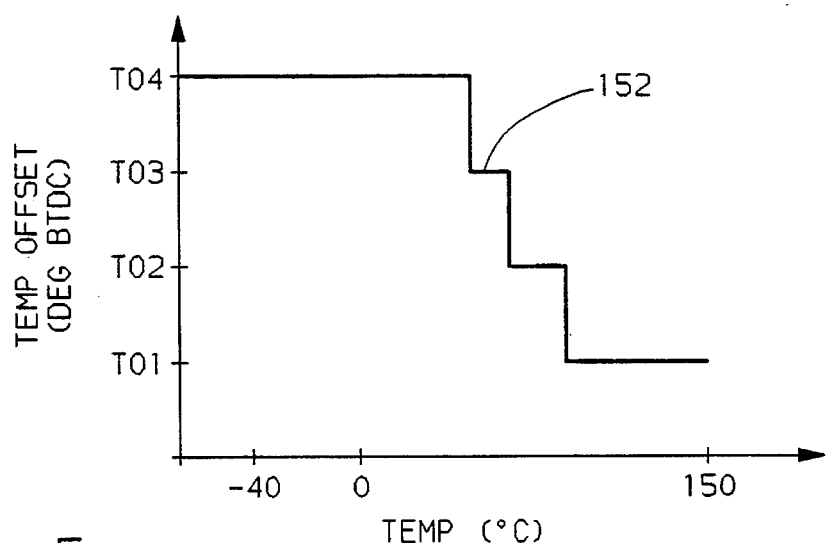
FIGS. 5 and 6 diagram relationships between operating parameters and fuel injection timing offsets that may be referenced during execution of the steps of FIGS. 2–4.

After determining BARO at the step 44, the routine proceeds to read coolant temperature TEMP at a step 46 from the described conventional coolant temperature sensor. A stored value ENDTIME is next read at the step 48, such as from powertrain control module 14 non-volatile memory, wherein ENDTIME represents a base time at which fuel injection to the current active engine cylinder should cease. ENDTIME may be a fixed angular offset away from a cylinder top dead center position and may be determined in a conventional engine calibration process. A coolant temperature offset is next read at the step 50 as an angular offset before the referenced ENDTIME in accord with conventional practice of varying fuel injection timing in accord with coolant temperature TEMP. Curve 152 of FIG. 5 illustrates a calibrated relationship between coolant temperature TEMP and the temperature offset expressed in degrees before cylinder top dead center. The offset is at a maximum value TO4 at minimum temperature of about −40 degrees Celsius, and decreases in steps with increasing temperature to a minimum offset TO1 at maximum temperature of about 150 degrees Celsius.

Figure 6:
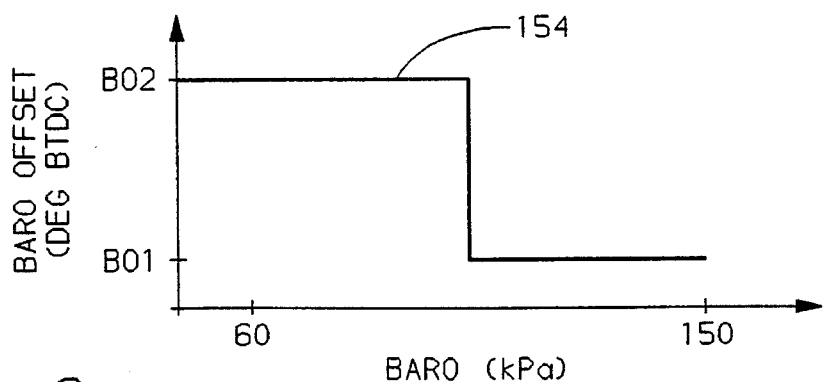

After looking up the temperature offset, which may be stored using the information represented in FIG. 6 in the form of a conventional look-up table in powertrain control module non-volatile memory, the routine proceeds to a step 52 to store the referenced offset in controller memory. The routine next looks up a BARO offset at a step 54 as a function of the BARO value determined at the step 44, wherein the BARO offset represents the change in fuel injection timing that compensates for the change in air-fuel mixing characteristics corresponding to a change in BARO. The BARO offset referenced at the step 54 is applied to retard fuel injection timing to allow for increased air-fuel mixing, more complete combustion, increased engine performance, reduced engine emissions, improved catalytic converter efficiency and durability in accord with the principles of this invention. The relationship between the BARO offset and barometric pressure is illustrated generally in FIG. 6 in which curve 154 represents a change in the BARO offset between offset BO2 corresponding to low barometric pressure and offset BO1 corresponding to high barometric pressure. In this embodiment, a switch in offset values from BO2 to BO1 occurs as the barometric pressure increase above a pressure of about 80 kPa. As is illustrated in FIG. 6, for the calibrated curve 154 corresponding to this embodiment, the offset, which is expressed in degrees before cylinder top dead center position is greater for low barometric pressures and is decreased for higher barometric pressures. Fuel injection will thus occur earlier in an engine cycle for low BARO to increase air-fuel mixing time, as described.

Returning to FIG. 2, after referencing the BARO offset, which may be stored as a conventional look-up table representing the relationship between barometric pressure and the BARO offset illustrated generally by curve 154 of FIG. 6, the barometric offset is stored in powertrain control module memory at a step 56. A value ENDINJECT is next calculated at a step 58 as a combination of ENDTIME, determined at step 48, and the TEMP and BARO offsets stored at the respective steps 52 and 56. For example, the value ENDINJECT may be arrived at by reducing the angle represented by ENDTIME by the TEMP and BARO offsets. The calculation at step 58 may also include any necessary conversion from time-based values to values expressed in mechanical degrees, such as degrees before cylinder top dead center position. The value ENDINJECT calculated at the step 58 represents a desired end of injection time to be used until such time may be updated such as in accord with updated temperature or barometric pressure determinations, as will be described. After calculating ENDINJECT at the step 58, it is stored in powertrain control module memory at the step 60 and conventional powertrain control module interrupts are next enabled at a step 62. Such interrupts may include time-based interrupts and event-based interrupts which include appropriate interrupt service routines for carrying out time-based and event-based powertrain control operations generally understood in the art. Such interrupts may be enabled at the step 62 to occur following predetermined periods of time or to occur upon occurrence of predetermined engine events.

After enabling the interrupts at the step 62, background operations which are represented generally by the step 64 are repeatedly executed while the powertrain control module 14 is operating. Such operations may include conventional diagnostic and maintenance operations as well as control operations which may be repeatedly executed until such time as higher priority operations are requested of the powertrain control module 14 of FIG. 1. For example, upon occurrence upon certain time and event-based interrupts as enabled at the step 62, the background operations of step 64 may cease temporarily and service operations for such interrupts may be carried out. The background operations may resume upon completion of the interrupt servicing.

The routine of FIG. 3 illustrates operations used to service a time-based interrupt enabled at the step 62 of FIG. 2 to occur approximately at 12.5 intervals. Generally, the routine of FIG. 3 periodically updates the TEMP and BARO offsets and updates the ENDINJECT value accordingly, so that fuel injection timing may correspond to current engine operating conditions. The routine is entered at a step 80 following a 12.5 millisecond timer interrupt, ad proceeds to carry out general interrupt service operations at a step 82. Such service operations may include resetting the interrupt so that it again occurs after about 12.5 millisecond have elapsed, and other powertrain control, diagnostic, or maintenance functions that may be preferably executed during a 12.5 millisecond interval, or some multiple of a 12.5 millisecond interval.

After carrying out such service operations, the routine proceeds to read the throttle position output signal TP from sensor 24 at a step 84. The routine next determines whether TP is at a wide open throttle position WOT at a step 86. A wide open throttle position corresponds to a throttle position generally above approximately 80% throttle, at which position there may be a close correlation between the MAP signal value and barometric pressure, due to the likely low pressure drop across the intake air valve 22 when the valve is at an angular position providing little restriction to intake air passing thereby. At WOT, there is potential for accurately determining barometric pressure using the MAP signal, so that BARO offset adjustment may be made without requiring a dedicated barometric pressure sensor.

Returning to FIG. 3, if the throttle position TP is determined to be at a wide open throttle position WOT at the step 86, the routine proceeds to read engine speed RPM at a step 88. Next, the read engine speed RPM is compared to a threshold value KRPM which is calibrated as approximately 1500 r.p.m. in this embodiment. If RPM is below KRPM at the step 90, then the combined intake valve position and engine speed supports use of the MAP sensor for barometric pressure estimation, as the throttle is in a low restriction position and little air is passing thereby, so that a very small pressure drop can be expected across the valve 22 from the atmosphere into the intake manifold. In such case, the routine proceeds to read MAP at the step 92, and determine BARO at the step 94, such as in the manner described for the step 44 of FIG. 2. As indicated for the step 44, other factors, including engine speed RPM and throttle position TP may be used in a table lookup for BARO estimation. A BARO offset is next referenced using the determined BARO in the manner described for the step 54 of FIG. 2, and such BARO offset may be stored at a next step 98 to replace any prior stored BARO offset value, so that only the most current BARO information is used to determine the BARO offset for fuel injection timing adjustment in accord with this invention. In an alternative embodiment of this invention, a dedicated barometric pressure may be provided and may be periodically read for periodic adjustment of the BARO offset, so that the updating of the BARO offset will be subject to proper RPM and TP conditions.

After storing the new BARO offset value at the step 98, or if engine speed or throttle position did not permit a new BARO offset to be determined at either of the steps 86 or 90, the routine proceeds to read coolant temperature at a step 100, such as from a memory location at which it is periodically updated in accord with conventional engine operating control practices, and then proceeds to look up the temperature offset at the step 102, such as in the manner described for the step 50 of FIG. 2. The temperature offset is next stored at a step 104 to replace any prior stored temperature offset value, such as in the manner described for the step 52 of FIG. 2.

A value ENDINJECT defining the desired end of fuel injection to the active cylinder is determined next at a step 106, such as in the manner described at the step 58 of FIG. 2 but using the updated temperature and any updated BARO offset information that may have been provided through execution of the described steps of FIG. 3. The value ENDINJECT is next stored in powertrain control module memory at the step 108 and then the interrupt service routine of FIG. 3 returns via step 110 to any prior operations that were ongoing at the time of such interrupt.

Referring to FIG. 4, an event-based interrupt service routine is generally illustrated for servicing a crank event interrupt generated upon signal RPM crossing a threshold signal value. As described, the periodic signal RPM indicates engine angular position, wherein engine positions corresponding to specific engine events may be indicated by the signal RPM crossing certain threshold values. When the signal RPM crosses a predetermined level indicating a cylinder top dead center position, the crank event interrupt serviced by the routine of FIG. 4 is generated. The routine is entered at a step 120 and proceeds to carry out general service operations at a step 122, including operations to reset the crank event interrupt, and any other control or diagnostic operations that, in accord with conventional engine control practices, may be carried out for each cylinder top dead center position. Following such service operations, a fuel pulse width PW command is determined at a step 124 as a function of conventionally known operating conditions such as engine speed, engine load, desired engine air/fuel ratio, and other generally available operating parameters. The determined pulse width represents a period of time such as may be expressed as a number of crank angle degrees during which the injector corresponding active cylinder to next receive fueling in accord with conventional fuel control is to inject pressurized fuel ultimately for delivery to the cylinder. The pulse width PW may be determined by referencing a PW value from a conventional look-up table stored in controller non-volatile memory as a predetermined function of the described operating conditions. After determining PW at the step 124, the routine reads the most recent stored ENDINJECT value at the step 126 and outputs PW and ENDINJECT at a step 128 to controller 20. Controller 20 of FIG. 1 will take such fuel injection control information and will, in general, subtract the PW angle from the ENDIN- JECT angle to determine a start angle which is an engine angular position at which injection for the active cylinder should commence. An injector driver from the set of drivers 26 of FIG. 1 for driving the injector corresponding to the active cylinder will be driven open by controller 20 starting at the start angle and ending at the ENDINJECT angle to provide for a timed delivery of the desired fuel quantity to the active cylinder.

After outputting the injection information to controller 20 of FIG. 1 so that it may carry out its injector driver control in accord with this embodiment, control and diagnostic operations are carried out at the step 130 such as ignition or intake air control to engine 10, or transmission control, or diagnostics of powertrain systems as may be generally included with the described fuel injection control operations for illustrating this embodiment. After carrying out any such crank-event based control and diagnostics, the routine proceeds to return to any prior operations that were ongoing at the time of the crank event interrupt via the step 132.

The preferred embodiment for the purpose of explaining the invention is not to be taking as limiting or restricting this invention since many modifications may be made through the exercise of ordinary skill in the art without departing from the scope of this invention.

The embodiments of the invention in which a property or privilege is claimed are described as follows:

1. A fuel injection timing control method for injecting a quantity of fuel into an automotive engine, comprising the steps of:

generating a pressure value representing barometric pressure;

referencing a base value indicating an engine operating angle at which the quantity of fuel is to be delivered to the engine;

referencing an adjustment value as a predetermined function of the generated pressure value;

adjusting the referenced base value in accord with the referenced adjustment value; and injecting the quantity of fuel substantially at the angle corresponding to the adjusted referenced base value.

2. The method of claim 1, wherein engine intake air is metered to an engine intake manifold by an intake air valve, further comprising the steps of:

sensing a presence of engine operating conditions associated with a substantially small pressure drop across the intake air valve; and sensing intake manifold absolute air pressure upon sensing the presence; and wherein the generating step generates the pressure value as a predetermined function of the sensed intake manifold absolute air pressure.

3. The method of claim 1, wherein engine intake air is metered to an engine intake manifold by an intake air valve, the method further comprising the steps of:

sensing engine speed;

sensing intake air valve position;

determining when intake air valve position is above a predetermined position threshold;

determining when engine speed is below a predetermined speed threshold when the intake air valve position is determined to be above the predetermined position threshold; and sensing intake manifold absolute air pressure when engine speed is determined to be below the predetermined speed threshold;

and wherein the generating step generates the pressure value as a predetermined function of intake manifold absolute air pressure when engine speed is determined to be below the predetermined speed threshold.

4. The method of claim 3, wherein the generating step generates the pressure value as a predetermined function of intake manifold absolute air pressure, engine speed, and intake air valve position when engine speed is determined to be below the predetermined speed threshold.

5. The method of claim 1, further comprising the steps of:

determining a temperature value indicating engine temperature;

referencing a timing offset value as a predetermined function of the determined temperature value;

further adjusting the referenced base value in accord with the referenced timing offset value.

6. The method of claim 5, wherein the determined temperature value is engine coolant temperature.

7. A method for determining an engine operating angle at which to deliver a predetermined fuel quantity to the engine, comprising the steps of:

establishing a base fuel injection timing value;

estimating barometric pressure;

referencing a fuel injection timing offset value as a predetermined function of barometric pressure;

adjusting the base fuel injection timing value by the referenced fuel injection timing offset value; and delivering the predetermined fuel quantity to the engine at the engine operating angle corresponding to the adjusted base fuel injection timing value.

8. The method of claim 7, further comprising the step of:

for each of a set of barometric pressure values, providing a fuel injection timing offset value to compensate fuel injection timing at the corresponding barometric pressure value, and wherein the referencing step further comprises the step of selecting the barometric pressure value corresponding to the estimated barometric pressure from the set of barometric pressure values, and wherein the referencing step references the fuel injection timing value corresponding to the selected barometric pressure value.

9. The method of claim 7, wherein a throttle valve meters air to an engine intake manifold, the method further comprising the steps of:

sensing a presence of a predetermined low pressure drop condition corresponding to a low pressure drop across the throttle valve;

sensing engine intake manifold air pressure when the low pressure drop condition is sensed to be present; and wherein the estimating step estimates barometric pressure as a predetermined function of the sensed intake manifold air pressure.

\* \* \* \* \*